US008400398B2

(12) United States Patent
Schoen et al.

(10) Patent No.: US 8,400,398 B2
(45) Date of Patent: Mar. 19, 2013

(54) VISUALIZATION CONTROLS

(75) Inventors: Eric Jonathan Schoen, Bellaire, TX (US); Mark S. Passolt, Hafrsfjord (NO); Andrew Muddimer, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 849 days.

(21) Appl. No.: 12/549,162

(22) Filed: Aug. 27, 2009

(65) Prior Publication Data

US 2011/0050562 A1    Mar. 3, 2011

(51) Int. Cl.
*G09G 5/00*    (2006.01)
(52) U.S. Cl. .............................. 345/156; 345/158
(58) Field of Classification Search .................. None
See application file for complete search history.

(56) References Cited

U.S. PATENT DOCUMENTS

| | | | |
|---|---|---|---|
| 5,581,276 A | 12/1996 | Cipolla | |
| 6,147,678 A | 11/2000 | Kumar | |
| 6,222,465 B1 | 4/2001 | Kumar | |
| 8,218,811 B2 * | 7/2012 | Boyd et al. | 382/100 |
| 8,230,367 B2 * | 7/2012 | Bell et al. | 715/863 |
| 2002/0041327 A1 | 4/2002 | Hildreth | |
| 2006/0033713 A1 | 2/2006 | Pryor | |

* cited by examiner

*Primary Examiner* — Muhammad N Edun

(57) ABSTRACT

Implementations of visualization controls are described. Some techniques described herein enable a user to interact with a geoscience object on display. In one possible embodiment, simultaneous movements of two or more user-controlled points are tracked using a motion monitoring system, such as cameras. The movement of the points is then interpreted as an interaction with the geoscience object and results in a corresponding alteration of the display of the geoscience object. One example interaction includes a compound manipulation (i.e. translation, rotation, scaling and/or skewing) of the geoscience object.

20 Claims, 8 Drawing Sheets

VISUALIZATION CONTROLS

BACKGROUND

In order to examine a potential or existing hydrocarbon field, such as an oilfield or a gas field, a geoscience object can be created from seismic and other data associated with the field. Geoscience objects are often computer-generated models representing a variety of information, including approximations of subsurface geologic conditions within the field. As computing power has increased, the amount of information included in geoscience objects has also increased, resulting in very useful but complex models.

SUMMARY

Implementations of visualization controls are described. In one possible embodiment, movement of two or more user-controlled points is tracked using a motion monitoring system which can include one or more cameras, accelerometers, etc. The movement of the points is interpreted as an interaction with a geoscience object being displayed. In one implementation, the interaction can be a compound manipulation of the geoscience object (i.e. two or more of translating, rotating, scaling and/or skewing the geoscience object). After the interaction is recognized, the display of the geoscience object is correspondingly altered.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE CONTENTS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to apparatus and techniques for implementing visualization controls. More particularly, the apparatus and techniques described herein involve allowing a user to interact with a geoscience objects, including one dimensional, and multi-dimensional geoscience objects, and alter their display.

For example, in one possible implementation, a user can manipulate a geoscience object, such as a three dimensional geoscience object, being displayed through a single gesture using two or more tracked points. For example, the user can effect rotation and stretching of the geoscience object by designating a pivot point in space with one point, while simultaneously moving another point away from the pivot point and rotating the other point in a desired direction of rotation of the geoscience object in three space. The amount of stretching and the direction of rotation can be measured using two or more positional and/or directional devices, such as cameras, accelerometers, etc.

In another example implementation, a plurality of points corresponding to one or more points designated and/or controlled by a user, such as the user's hands, can be recognized and tracked. This information can then be used to recognize a variety of user interactions with a geoscience object. For instance, in one possible embodiment, the user can select a point of interest on the geoscience object by closing one of his hands at the point of interest on the geosciences object. The user can then stretch the geoscience object by moving his hand away from the point of interest and simultaneously effect other manipulations, such as rotation, translation, scaling and/or skewing, through additional hand movements.

Example Computing Environment

Figure 1:
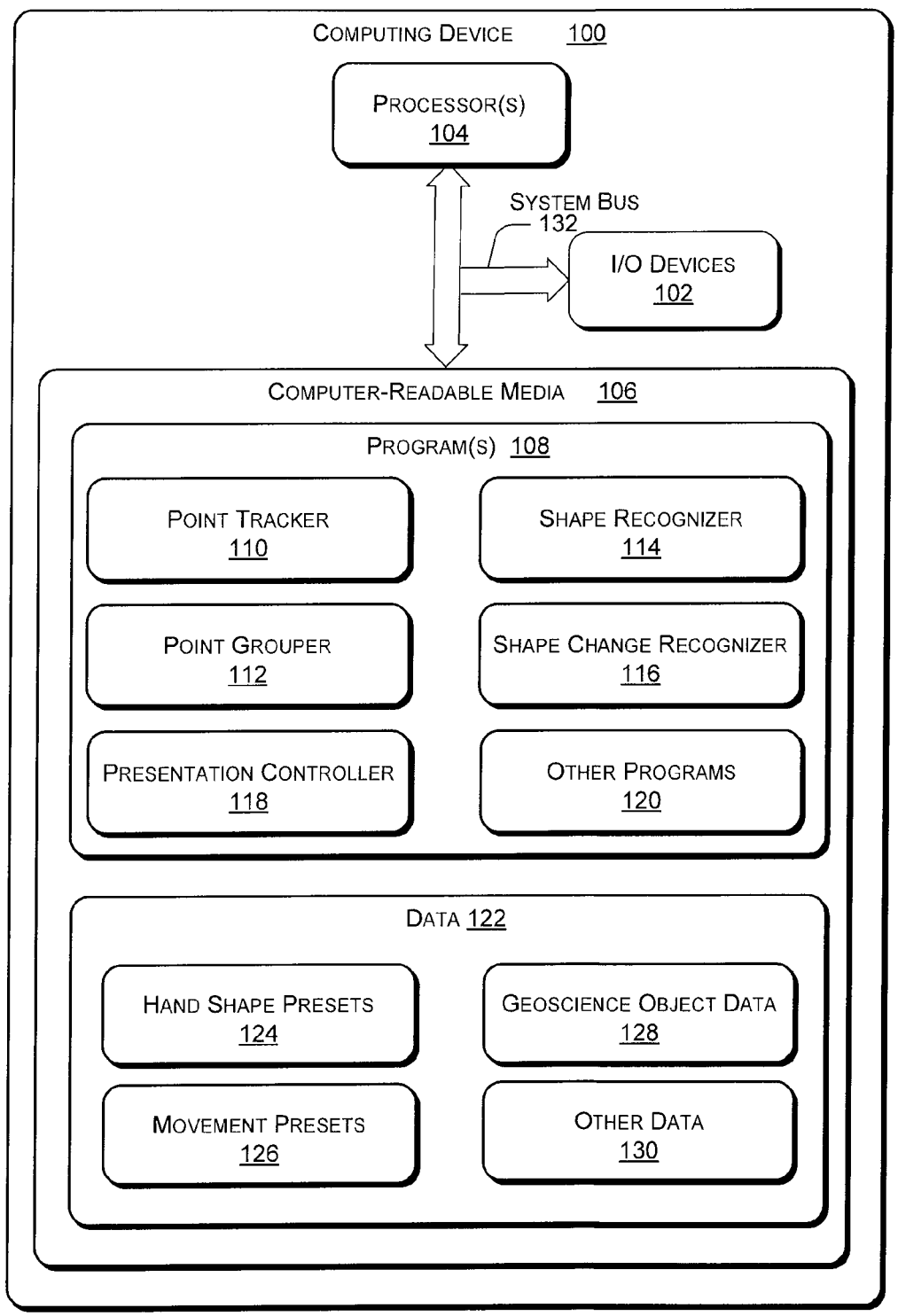
FIG. 1 illustrates an example computing device on which elements of visualization controls may be implemented.

FIG. 1 shows an example computing device 100 suitable for implementing embodiments of visualization controls. Computing device 100 can be implemented as any form of computing and/or electronic device. For example, computing device 100 can include a server, a desktop PC, a notebook or portable computer, a workstation, a mainframe computer, an Internet appliance and so on. Computing device 100 includes input/output (I/O) devices 102, one or more processor(s) 104, and computer readable media 106.

I/O devices 102 can include any device over which data and/or instructions can be transmitted or received by computing device 100. For example, I/O devices 102 can include one or more of an optical disk drive, a USB device, a keyboard, a touch screen, a monitor, a mouse, a digitizer, a scanner, a track ball, various cameras—including cameras with a depth of field function, motion detection devices, etc.

I/O devices 102 can also include one or more communication interface(s) implemented as any of one or more of a serial and/or parallel interface, a wireless interface, any type of network interface, a modem, a network interface card, or any other type of communication interface capable of connecting computing device 100 to a network or to another computing or electrical device.

Processor(s) 104 include microprocessors, controllers, and the like configured to process various computer executable instructions controlling the operation of computing device 100. For example, processor(s) 104 can enable computing device 100 to communicate with other electronic and computing devices, and to process instructions and data in conjunction with programs 108 stored in computer-readable media 106.

Computer-readable media 106, can include one or more memory components including random access memory (RAM), non-volatile memory (e.g., any of one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 106 provides storage mechanisms to store various information, data and/or instructions such as software applications and any other types of information and data related to operational aspects of computing device 100. For example, programs 108 stored on computer-readable media 106 can include a point tracker 110, a point grouper 112, a shape recognizer 114, a shape change recognizer 116, a presentation controller 118 and other programs 120—such as an operating system and/or assorted application programs. Programs 108 can be executed on processor(s) 104.

Computer-readable media 106 can also include data 122. For example, as illustrated in FIG. 1, data 122 residing on computer-readable media 106 can include hand shape presets 124, movement presets 126, geoscience object data 128 and other data 130 (including intermediate and final data created through use of one or more of programs 108).

Any of programs 108 and data 122 can reside wholly or partially on any of a variety of media types found in computer-readable media 106. For example portions of point tracker 110 can reside at different times in random access memory (RAM), read only memory (ROM), optical storage discs (such as CDs and DVDs), floppy disks, optical devices, flash devices, etc.

A system bus 132 can couple one or more of the processor(s) 104, I/O devices 102 and computer-readable media 106 to each other. System bus 132 can include one or more of any of several types of bus structures, including a memory bus or memory controller, a peripheral bus, an accelerated graphics port, and a processor or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, and a peripheral component interconnects (PCI) bus also known as a mezzanine bus, and so on.

Example Environment

Figure 2:
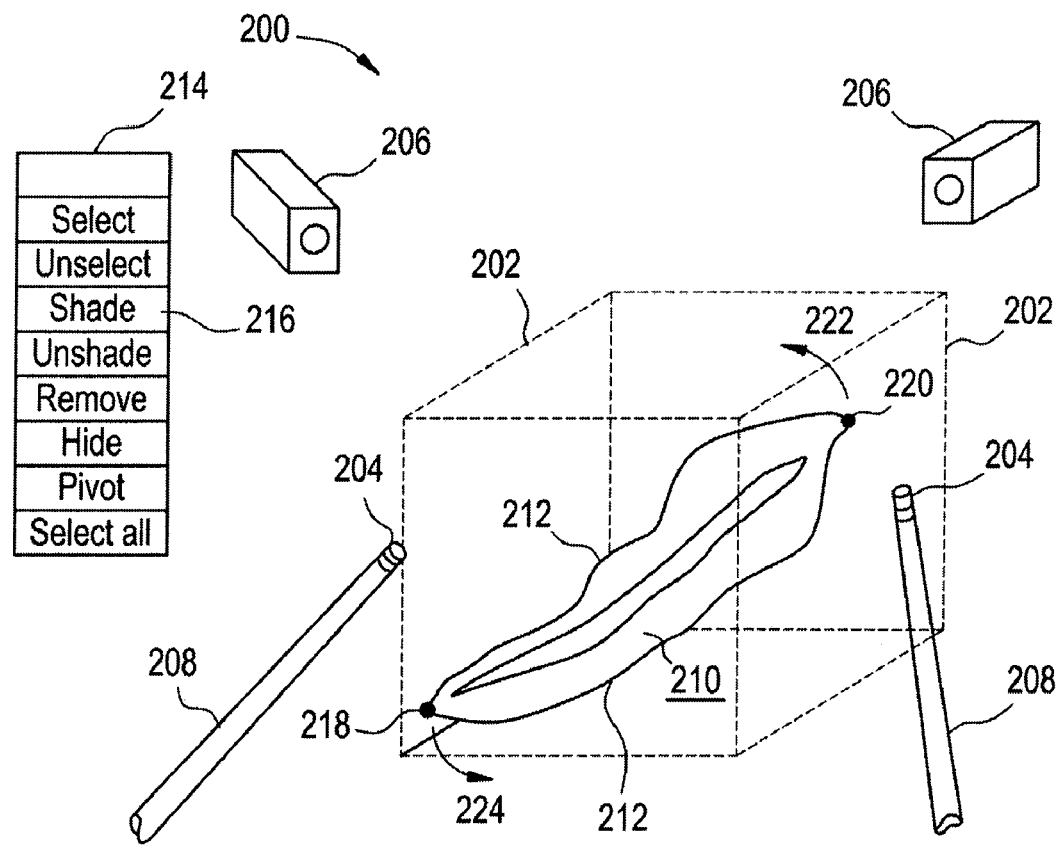
FIG. 2 illustrates point recognition in accordance with one embodiment of visualization controls.

FIG. 2 illustrates an environment 200 in which embodiments of visualization controls can be practiced. Environment 200 includes a three dimensional (3D) geoscience object 202 modeling one or more geologic areas of interest (such as, for example, one or more points, areas, surfaces, volumes, or any collection thereof). The term "geoscience object" as used herein (including 3D geoscience object 202), includes any geologic formation, as well as any geologic or geo-scientific data of interest, which can be displayed to a user. For example, in one possible implementation 3D geoscience object 202 includes one or more seismic data cubes taken from a reservoir model. In another possible implementation, 3D geoscience object 202 includes one or more features, such as salt domes or river beds, taken from one or more seismic data cubes.

It will also be understood that even though the geoscience object discussed in the description of this implementation (as well as in assorted descriptions of other implementations below) is a 3D geoscience object, visualization controls can be used with any manner of geoscience objects, having any number of dimensions.

3D geoscience object 202 can be displayed using any display device known in the art. For instance, in one implementation, 3D geoscience object 202 can be displayed using a stereo rendering device, such as virtual reality goggles. In another possible implementation, 3D geoscience object 202 can be displayed using a monitor, such as a flat panel display. In still another implementation, 3D geoscience object 202 can be displayed using a display device allowing for three space projection (such as, for example, holographic projection).

A user can be allowed to interact with 3D geoscience object 202 using two or more user-controlled points 204. These points can include anything detectable and trackable by a motion monitoring system 206. For example, points 204 can include electrical devices, colored pads, magnetic emitters, light emitting diodes, accelerometers or any other devices known in the art which can be utilized to determine a position and/or movement of points 204 in space.

As illustrated in FIG. 2, in one implementation points 204 can be found on positional devices 208 which themselves can be manipulated by a user. Positional devices 208 can include wooden sticks, plastic rods, body parts of a user (such as feet, toes, hands, fingers, knees, elbows, etc.) computer mice, game controllers, or any other pointing and/or motion devices known in the art. Moreover, as will be described more fully below in conjunction with FIGS. 4 and 5, more than two points 204 can be used, including more than two points 204 per positional device 208.

Though points 204 are shown in many of the Figs accompanying this disclosure as separate physical elements, it will be understood that points 204 need not be physical items attached to positional devices 208. For instance, motion monitoring system 206 may be able to directly detect and track positional devices 208 without a physical device, such as a colored pad, magnetic emitter, light emitting diode, etc., on the positional device 208. In such instances, no extra physical point 204 need be provided on the positional devices 208. Rather points 204 in such cases will be understood to be points or positions on positional devices 208 which are detected and tracked by motion monitoring system 206. Stated another way, in all of the embodiments described herein, it may be possible to practice visualization controls without specific physical points 204 being attached to positional devices 208. Rather points in such instances 204 will be understood to mean portions of positional devices 208 which are detected and tracked by motion monitoring system 206. Motion monitoring system 206 includes device(s) suitable for detecting and tracking the location and movement of points 204 in free space, including cameras, motion detectors, accelerometers, global positioning system transmitters and/or receivers, and so on. For instance, motion monitoring system 206 can include one or more cameras—including one or more cameras having depth of field functionality—such that a location of points 204 relative to motion monitoring system 206 can be detected and/or calculated. Motion monitoring system 206 may also be placed anywhere in environment 200, including in front of a user, behind a user, to the side of a user, on a user, on positional device 208, or any combination thereof. Furthermore, portions of motion monitoring system 206 can be located remotely from environment 200.

Motion monitoring system 206 can also include one or more computing devices, such as computing device 100.

In operation, once 3D geoscience object 202 is displayed, a user can utilize positional devices 208 and points 204 to interact with 3D geoscience object 202. For example, the user can manipulate positional devices 208 such that points 204 move to positions of interest on 3D geoscience object 202. In one implementation, the movement of points 204 is monitored by point tracker 110.

Positional devices 208 and or/points 204 can be represented in a display along with 3D geoscience object 202 (such as when the user is interacting with 3D geoscience object 202 as it is being displayed on a flat panel monitor). In such an implementation, movement of points 204 on the display can correspond to movement of points 204 effectuated by the user.

Alternately, if 3D geoscience object 202 is being displayed in three space, positional devices 208 and points 204 need not to be displayed on a display device. However, in such a scenario, positional devices 208 and or points 204 could still be represented on a display device for the sake of a variety of usability factors, including visibility, etc.

The user can select points and areas of interest in 3D geoscience object 202 using any method known in the art. For example, motion detection system 206 can detect when a user moves a point 204 to occupy a same space as a portion of 3D geoscience object 202. Upon such an occurrence, motion detection system 206 can register a contact between point 204 and 3D geoscience object 202. The result can include highlighting of the point on 3D geoscience object 202, emission of a sound indicating contact, vibration in positional device 208, or any other signal known in the art.

In one possible implementation, a user may see a feature of interest 210 in 3D geoscience object 202 and trace an outline 212 of feature 210 by guiding point 204 along an outside surface of feature 210. Outline 212 traced along the outside surface of feature 210 by the user can be indicated as the user moves point 204. For example a new line can be drawn in a different color or with a different characteristic (such as a dotted or hashed line) as outline 212 it is traced by the user. Alternately, outline 212 can be indicated once a closed loop has been created by the user.

In one implementation, presentation controller 118 can create a three dimensional volume in 3D geoscience object 202 by examining outline 212. For example, presentation controller 118 can examine the geological properties of any formations within the traced outline 212 and form a three dimensional feature in 3D geoscience object 202 by joining all volumes having geological properties similar to those found within outline 212 and which are contiguous to the area outlined by outline 212.

Feature 210 can also be indicated by a user contacting a portion of feature 210 with point 204. For example, motion monitoring system 206 may detect a point in 3D geoscience object 202 being contacted by point 204 and highlight all other contiguous points in 3D geoscience object 202 having geologic properties similar to the contact point.

In still another implementation, the user may interact with one or more menus 214 being displayed. Menus can include any commands or prompts that might be of use to a user interacting with 3D geoscience object 202. For example, menus might include commands to select, shade, pivot, hide, etc., portions or all of 3D geoscience object 202. For instance, in one implementation, the user can select feature 210 using one of the techniques described above then choose to shade feature 210 by contacting a shade command 216 on menu 214.

A user can effect various manipulations on 3D geoscience object 202, including compound manipulations, by manipulating points 204. For example, the user can stretch feature 210 by using points 204 to select points of interest 218, 220 on feature 210. The user can then move points 204 away from each other, such that points of interest 218, 220 follow, thus stretching feature 210.

Simultaneous to this, the user can also move points 204 relative to one another in other directions to manipulate feature 210 in other ways. For example, while stretching feature 210, the user can move point 220 down relative to point 218, thus tilting feature down (from left to right as illustrated in FIG. 2).

Similarly, the user can move point 220 of feature 210 into the page of FIG. 2 relative to point 218 to effect a complex translation of feature 210 in direction 222. The user can also hold point 220 steady while moving point 218 out from the page to effect a translation of feature 210 in direction 224. Moreover, the user can simultaneously move point 220 into the page and point 218 out from the page translating points 220 and 218 in directions 222 and 224 respectively.

Therefore, by using two or more points 204, the user can effect compound manipulations on 3D geoscience object 202 (including one or more features 210 therein) throughout three space by moving the two or more points 204 relative to one another.

A user can also effect various manipulations on 3D geoscience object 202, including compound manipulations, by selecting volumes of interest in 3D geoscience object 202. For example, in one possible implementation, the user can select feature 210 by any method known in the art (including tracing an outline of feature 210, or using menu 214 as discussed above). The user can then contact a point of interest in feature 210 with a point 204, indicting an interest to drag selected feature 210 in any direction of movement of point 204. Simultaneous to this, the user can contact another area of feature 210 with another point 204 and influence a movement of feature 210 using the other point 204.

For instance, once feature 210 has been selected, the user can contact point of interest 220 with a first point 204. The user can then drag feature 210 in the direction of point 204 through three space. Simultaneously, the user can contact feature 210 at point 218 with another point 204. If point 218 is kept stationary while point 220 is moved, feature 210 can be stretched or compressed. Alternately, if point 218 is moved relative to point 220, feature 210 can be simultaneously, stretched, compressed, translated rotated, etc., in accordance with the relative movements of the points 218 and 220.

Examples of Shape Recognition

Figure 3:
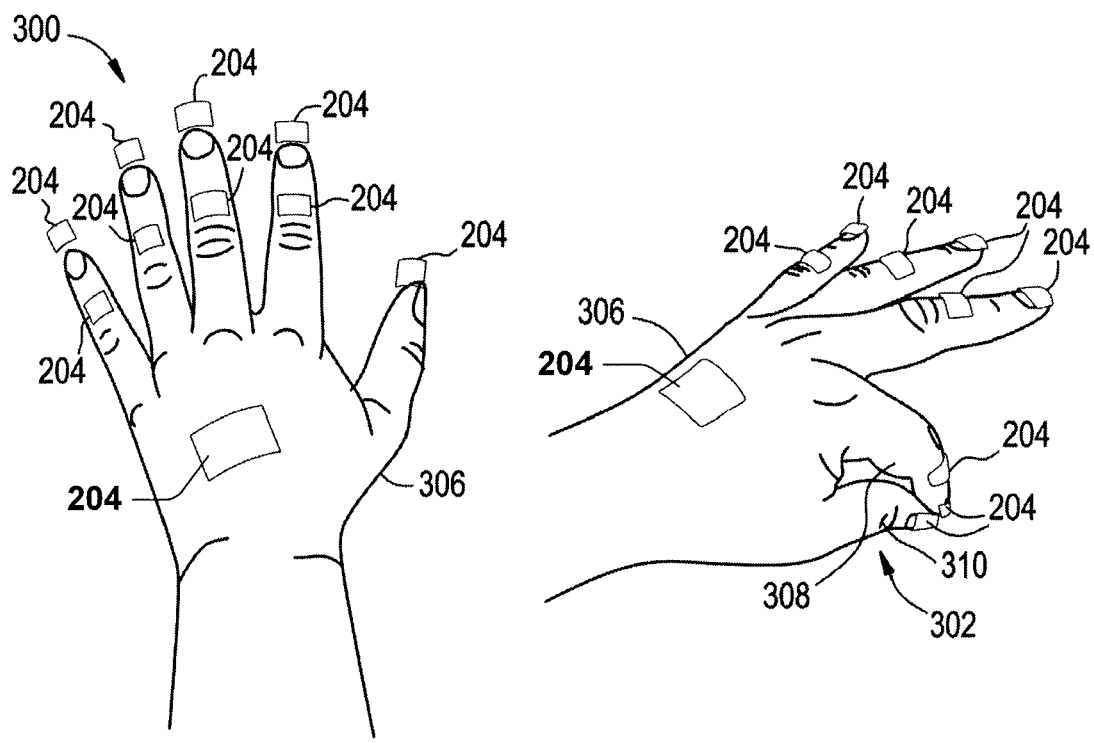
FIG. 3 illustrates shape recognition in accordance with various embodiments of visualization controls.
Figure 3:
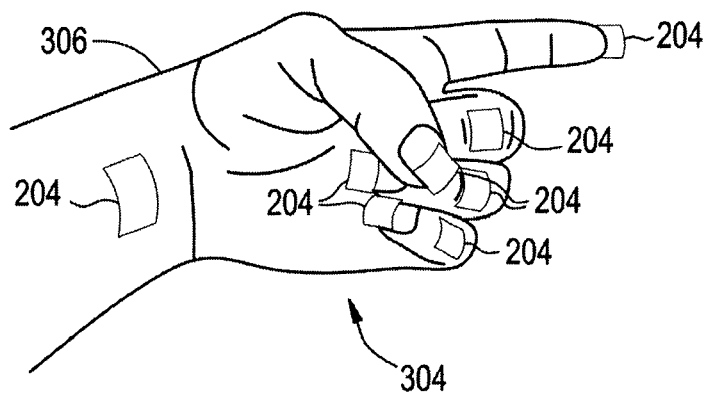

FIG. 3 illustrates several hand shapes 300-304 which can be detected using shape recognition in accordance with visualization controls. Under shape recognition a group of user-controlled points 204 can be observed and the positions and/or movements of points 204 in the group can be utilized to arrive at one or more secondary meanings.

For example, in hand shape 300, a user's hand 306 includes a plurality of points 204. The number and placement of points 204 on hand 306 can vary depending on the amount of information desired concerning the actions and locations of hand 306. For instance, if little information is required, then a single point 204 can be located at an end of a finger on hand 306, allowing the user to utilize the finger like one of the positional devices 208 in FIG. 2.

Alternately, if more information is required, more points 204 can be located on hand 306. Looking at hand shape 300, hand 306 includes points 204 on fingertips and various interim positions on fingers of hand 306, such as knuckles. Points 204 can also be located on other areas, such as on a back of hand 306, or in a palm of hand 306.

Once points 204 are detected by motion monitoring system 206, they can be examined for membership in a group. For example, points 204 on hand 306 can be processed by point grouper 112 and inferred to belong to a group representing hand 306. In one implementation, this can be accomplished through calibration. For instance, a user may be required to initially hold hand 306 away from any other hands or points 204 which might be used to interact with 3D geoscience object 202. In such a manner, point grouper 112 can be afforded an opportunity to detect points 204 on hand 306 without interference of other points 204 not associated with hand 306.

Once points 204 on hand 306 are grouped with hand 306, locations and/or movements of points 204 can be monitored by motion monitoring system 206 to determine what hand 306 is doing. For example, in hand shape 300, the relative locations of points 204 to one another can be processed by shape recognizer 114 to conclude that hand 306 is in an open or relaxed position. Shape recognizer 114 can arrive at this conclusion via any technique known in the art, including comparing the observed positions of points 204 against expected positions of points 204 in a defined open handed formation stored in hand shape presets 124.

Similarly, regarding hand shape 302, shape recognizer 114 can detect points 204 and infer from their relative positions that hand 306 is in a closed position. Many such closed handed positions can exist, with each position having a unique meaning. In the instant case, hand 306 can be inferred by shape recognizer 114 to be in a closed handed selection position since pointing finger 308 is in close proximity to thumb 310, approximating a natural configuration of hand 306 in the real world when a user wishes to pick something up between thumb 310 and pointing finger 308. In one implementation, shape recognizer 114 can make this recognition by comparing the positions of points 204 to presets in hand shape presets 124.

In a similar manner, positions of points 204 on hand 306 in hand shape 304 can be utilized by shape recognizer 114 to infer that hand 306 is in a pointing position rather than the closed handed selection position depicted in hand shape 302.

In this fashion, numerous hand shapes of hand 306 can be recognized by shape recognizer 114. This variability allows a user to express numerous real world hand positions in conjunction with motion monitoring system 206, giving each hand position a unique meaning.

It should also be noted that various hand shapes of hand 306 may also be assigned fanciful meanings in hand shape presets 124, purposefully differing from intuitive meanings which might be associated with the hand shape in the real world. Fanciful meanings for different hand shapes will be discussed in more detail in conjunction with FIGS. 4-5 below.

Changes from one recognized hand shape to another can also be utilized to convey a distinct meaning. In one implementation, shape change recognizer 116 can be utilized to detect such changes and assign them a meaning. For example, a user can convey a desire to select a point in 3D geoscience object 202 by transitioning from the open handed position of hand shape 300 to the closed handed position of hand shape 302—with the point of 3D geoscience object 202 to be contacted being found between pointer finger 308 and thumb 310.

In addition to changing hand shapes, movement of an unchanging hand shape can also have a preset meaning. For example, once a point of 3D geoscience object 202 is contacted—such as by selection through the closed handed position depicted in hand shape 302—the user can rotate the hand 306 in a twisting motion. This can be detected by a change in the positions of points 204 on hand 306 by motion monitoring system 206 and interpreted as a user command to rotate 3D geoscience object 202 about an axis running through a point of 3D geoscience object 202 being contacted between thumb 310 and pointer finger 308 of hand 306.

In this way, changes between hand shapes, as well as changes in orientations of hand shapes, can be utilized by a user to interact with 3D geoscience object 202 and convey user commands to alter a display of 3D geoscience object 202. If desired, the commands corresponding to hand shape changes and hand orientation changes can be intuitively mapped to commands that the user would intuitively expect to happen if the same motion(s) occurred in the real world. Alternately, if desired, some or all of the commands corresponding to hand shape changes and hand orientation changes can be mapped to fanciful and/or counterintuitive meanings.

In one possible implementation, once new hand shapes are recognized by shape recognizer 114, presentation controller 118 can stimulate various audio, mechanical, olfactory and/or visual cues to signal recognition of the new hand shape. For example, a closed handed shape can result in hand 306 being presented with a dashed outline or in a color different to that used when hand 306 was in an open handed shape. Alternately, in another example embodiment, the recognition of a new hand shape by shape recognizer 114 can result in presentation controller 118 stimulating the emission of a sound, such as a crushing sound when a closed handed shape is detected or a breezy sound when an open handed shape is detected.

The types of sounds, vibrations, colors, smells, etc, stimulated by presentation controller 118 upon the recognition of a new hand shape by shape recognizer 114 can be customizable by users and/or preset into presentation controller 118.

Example Manipulations

Figure 4:
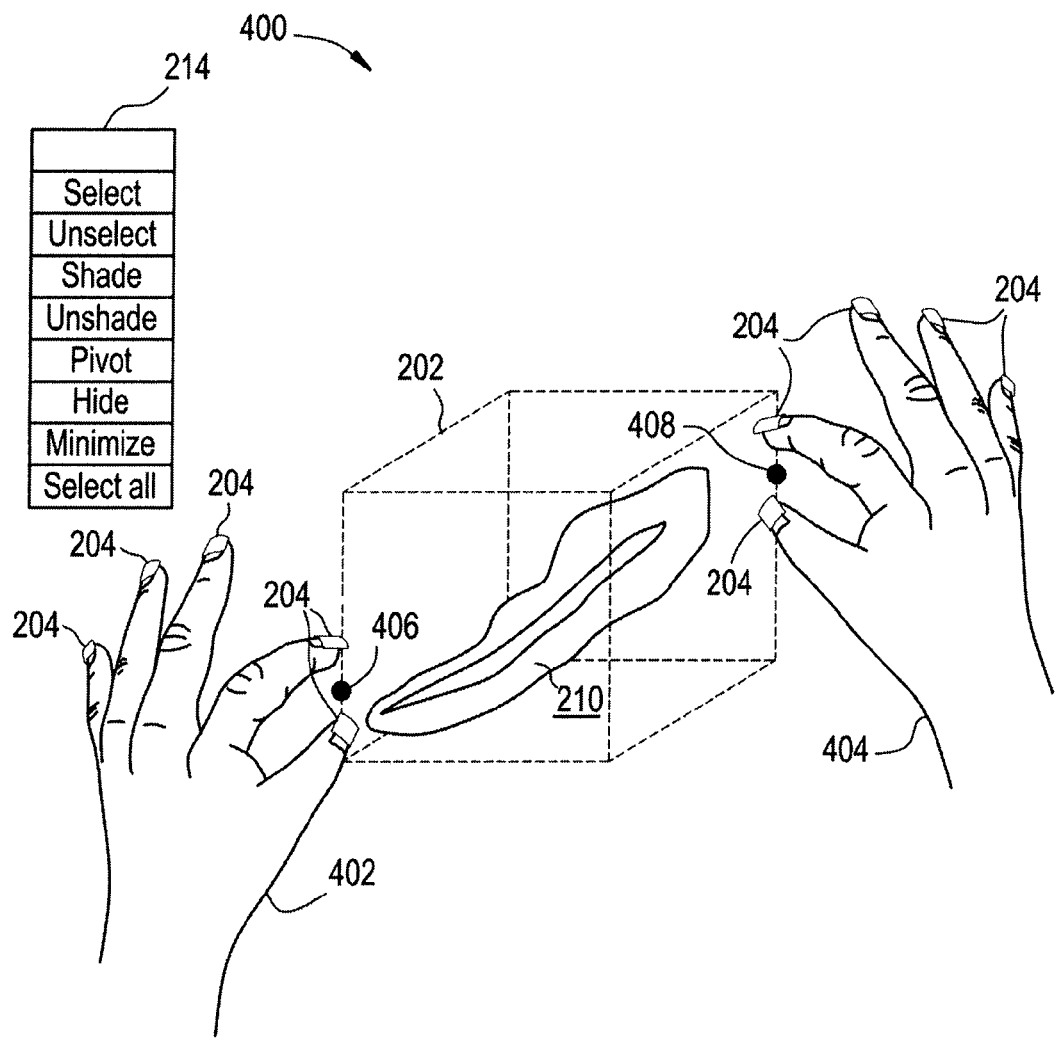
FIG. 4 illustrates an example interaction with a geoscience object in accordance with an embodiment of visualization controls.
Figure 5:
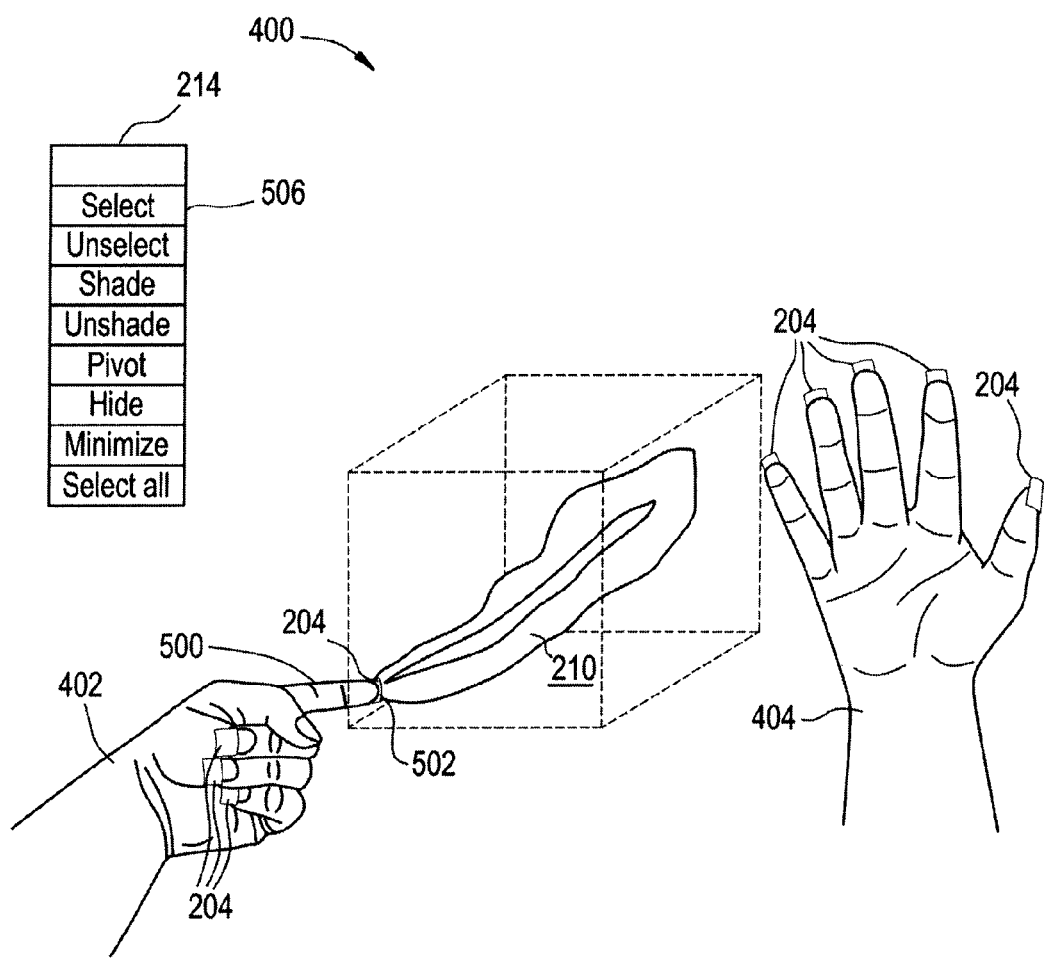
FIG. 5 illustrates an example interaction with a geoscience object in accordance with another embodiment of visualization controls.

FIGS. 4 and 5 illustrate an environment 400 in which two hands 402, 404 can effect numerous compound manipulations on 3D geoscience object 202. For example, through use of various embodiments of visualization controls as discussed herein, hands 402, 404 can effect two point manipulations on 3D geoscience object 202, including simultaneously scaling, shifting and/or rotating 3D geoscience object 202 in one gesture. Hands 402, 404 can also spatially manipulate 3D geoscience object 202 (i.e. simultaneously effecting one or more of translating, rotating, scaling and skewing 3D geoscience object 202).

Hands 402, 404 are shown as having user-controlled points 204 located only at the fingertips in FIGS. 4 and 5. It will be understood, however, that more or fewer points 204 can be located on each hand 402, 404 as desired. It will also be understood that more than two hands may be used.

Turning to FIG. 4, hand 402 is interacting with 3D geoscience object 202 at an interaction point 406 while hand 404 is interacting with 3D geoscience object 202 at an interaction point 408. In one possible implementation, point grouper 112 can detect points 204 on hand 402 and from information such as the relative positions of points 204, deduce that points 204 belong to hand 402. Shape recognizer 114 can then compare the orientation of points 204 to preset orientations stored in hand shape presets 124 and recognize a known hand shape of hand 404.

In a similar manner, points 204 corresponding to hand 404 can be recognized by point grouper 112, and a shape of hand 404 can be deduced by shape recognizer 114.

In the instant case, the configurations of points 204 with regard to both hands 402, 404 suggest that hands 402, 404 are in a closed handed selection position, thus indicating the user's desire to select points 406, 408 on 3D geoscience object 202. In one possible implementation, the grabbing of points 406 and 408 could be signaled with a perceptible indication, such as a noise, a highlighting of points 406, 408, a mechanical stimulation to the user (perhaps through gloves worn by the user on which points 204 may be attached), etc.

Once points 406 are selected, the user can effect compound manipulations of 3D geoscience object 202 by moving hands 402, 404 and/or by changing the shapes of hands 402,404. For example, in order to stretch 3D geoscience object 202 along an axis running through points 406 and 408, the user could move one or both of hands 402, 404 away from each other along the axis. Similarly, the user could compress 3D geoscience object 202 along the axis by moving one or more of hands 402, 404 towards each other along the axis.

Alternately, the user could rotate 3D geoscience object 202 about the axis running through points 406, 408 by rotating hands 402, 404 about the axis. Or, if desired, the user could rotate hands 402, 404 about the axis running through points 406, 408 while moving one or more of hands 402, 404 away from each other along the axis to effect a simultaneous rotation and stretching of 3D geoscience object 202 about the axis formed by points 406, 408.

In another possible implementation, hand 404 can move in any direction in free space, while hand 402 remains stationary. In such an implementation, 3D geoscience object 202 can pivot in the direction of movement of hand 404 about point 406. Similarly, both hands 402, 404 can move independently of one another, allowing the user to rotate, translate, shift, twist, bend, stretch and compress 3D geoscience object 202 in the same way the user would intuitively interact with a physical object being held in their hands.

If desired, movements can also be recognized in non natural modes. For example, upward movement by a user's hand corresponding to hand 404 could be recognized by presentation controller 118 to cause point 408 to move down relative to point 406. Similarly, movements to the right by user's hands corresponding to hands 402, 404 could be registered by presentation controller 118 to move displayed hands 402, 404 in other preset directions.

FIG. 5 illustrates more possible complex manipulations of 3D geoscience object 202 which can be accomplished through the use of visualization controls. For instance, points 204 can be recognized by point grouper 112 as belonging to hands 402 and 404. Shape recognizer 114 can then examine the configuration of points 204 corresponding to each hand 402, 404 against hand shape presets 124 to determine if either hand is in a position having an associated meaning.

In FIG. 5, hand 402 could be deduced to be in a pointing position, due to the outstretched position of point 204 on pointer finger 500. As such, the contact area of point 204 with 3D geoscience object 202 can be presented as an interaction point 502. Similarly, shape recognizer 114 can examine points 204 associated with hand 404 against hand shape presets 124 and determine that hand 404 is in an open handed position.

Once hand shapes have been determined, movements of hands 402, 404 can be detected and interpreted by presentation controller 118 to arrive at various meanings. In one possible implementation, movement presets 126 may ascribe significance to an open handed (such as hand 404) when a pointing hand (such as hand 402) is interacting with 3D geoscience object 202. For example, movement of hand 404 can be interpreted by presentation controller 118 to cause 3D geoscience object 202 to pivot about point 502 in a direction of movement of hand 404. In a similar manner, presentation controller 118 can be preprogrammed to interpret numerous meanings from scenarios involving shapes, changes of shapes, and/or movements of hands 402, 404.

These meanings can be intuitive (i.e. mimic interactions that a user would expect in real life if his hands were in such shapes, were changing shape and/or were engaged in such movements). Alternately, some or all of these meanings can be specialized, such as having 3D geoscience object 202 move in a direction opposite to that expected on the basis of a user's intuitive expectations given a certain hand movement.

Specialized meanings associated with hand shapes and/or hand movements can also be fanciful. For example, customized manipulations based on hand shapes, hand shape changes, and/or hand movement can be preprogrammed and saved in movement presets 126 in accordance with user or producer preferences. For example, in one possible implementation, contacting 3D geoscience object 202 with hand in a closed handed shape approximating a fist might be programmed in presentation controller 118 to effect an enlargement of 3D geoscience object 202. Similarly, in another possible implementation, a slap of 3D geoscience object 202 by a hand in an open handed shape may cause 3D geoscience object 202 to rotate 180 degrees about a preset axis.

In yet another possible implementation, a user could fashion one of hands 402, 404 into scissors by, for example, moving a pointer finger relative to a middle finger. In one aspect, this action could be interpreted by presentation controller 118 to effect a presentation of a cross-sectional view at a point of 3D geoscience object 202 contacted by the pointer finger and/or the middle finger. In another aspect, this scissor action might result in presentation controller 118 removing from display an area of 3D geoscience object 202 traced by hand 402, 404 while making scissor motions.

Moreover, certain interactions of hands 402, 404 may also be programmed into presentation controller 118 to result in custom manipulations of 3D geoscience object 202, even when there is no contact between hands 402, 404 and 3D geoscience object 202. For example, presentation controller 118 can be programmed to interpret clapping of hands 402, 404 together to mean that the user wishes to rotate 3D geoscience object 202 90 degrees about a given axis.

Similarly, in another possible implementation, sliding of one hand 402, 404 against the other may be recognized by presentation controller 118 as meaning that the user wishes for 3D geoscience object 202 to rotate in a direction of a designated one of hands 402, 404 and in an amplitude and/or speed corresponding to a motion of the designated hand.

Furthermore, in another possible implementation, a custom manipulation can enable the user to effect rotation of 3D geoscience object 202 around a chosen point in space. For example, in one implementation the user can designate a point in space, such as point 504, by either placing point 204 of hand 402 at point 504, or placing any point 204 of either hand 402, 404 at point 504 then choosing a "Select" command 506 from menu 214. The user can then move either of hands 402, 404 causing 3D geoscience object 202 to rotate about point 504 in the direction of motion of the moving hand 402, 404.

Therefore, as noted above, by utilizing the concepts of visualization controls, a user can employ any combination of hand shapes, changes of hand shapes and motions of hands 402, 402 to manipulate 3D geoscience object 202 in any desired fashion. This can include compound manipulations comprising two or more simultaneous acts, such as scaling, shifting, rotating, translating, skewing, etc., of 3D geoscience object 202.

Example Methods

Figure 6:
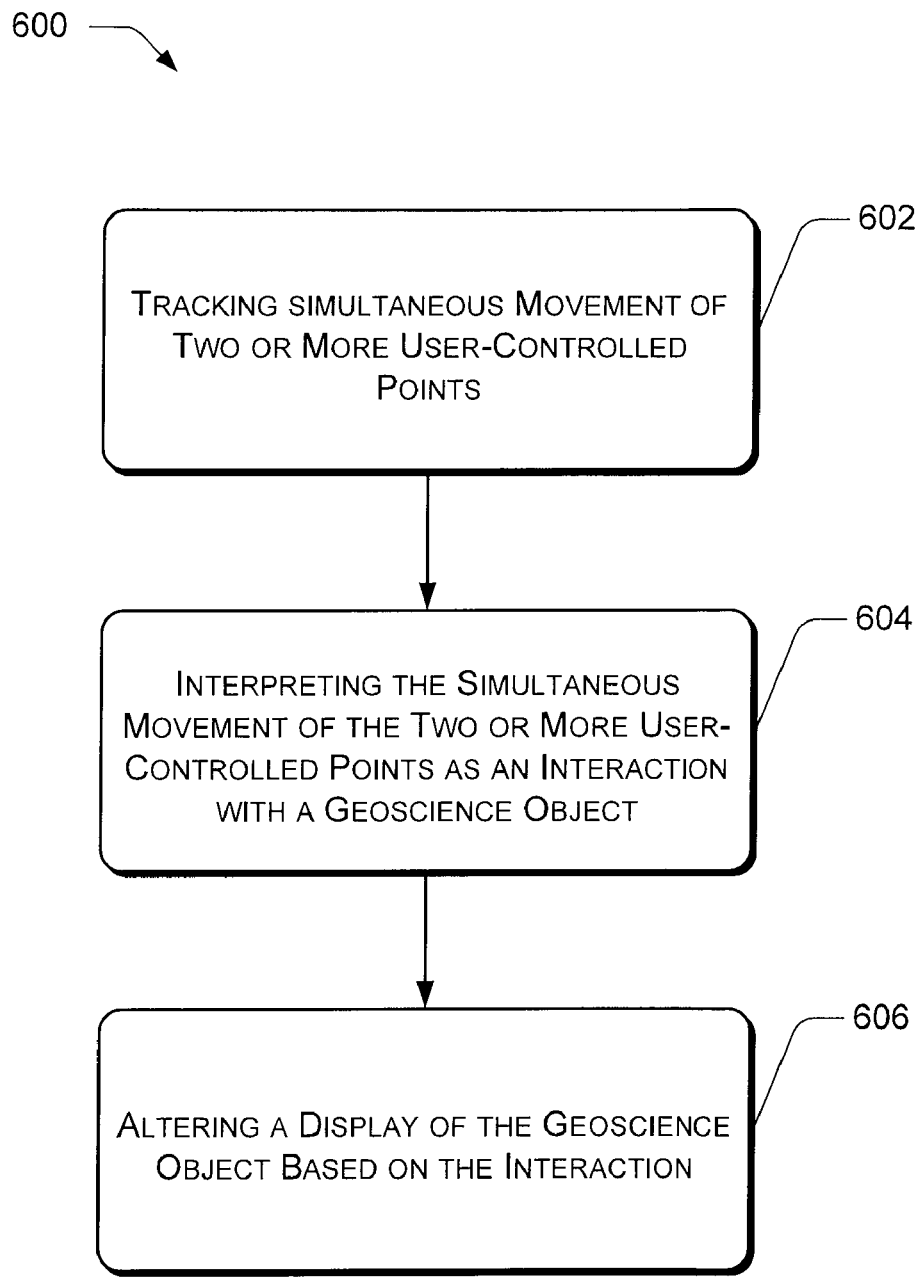
FIG. 6 illustrates example method(s) for visualization controls.
Figure 7:
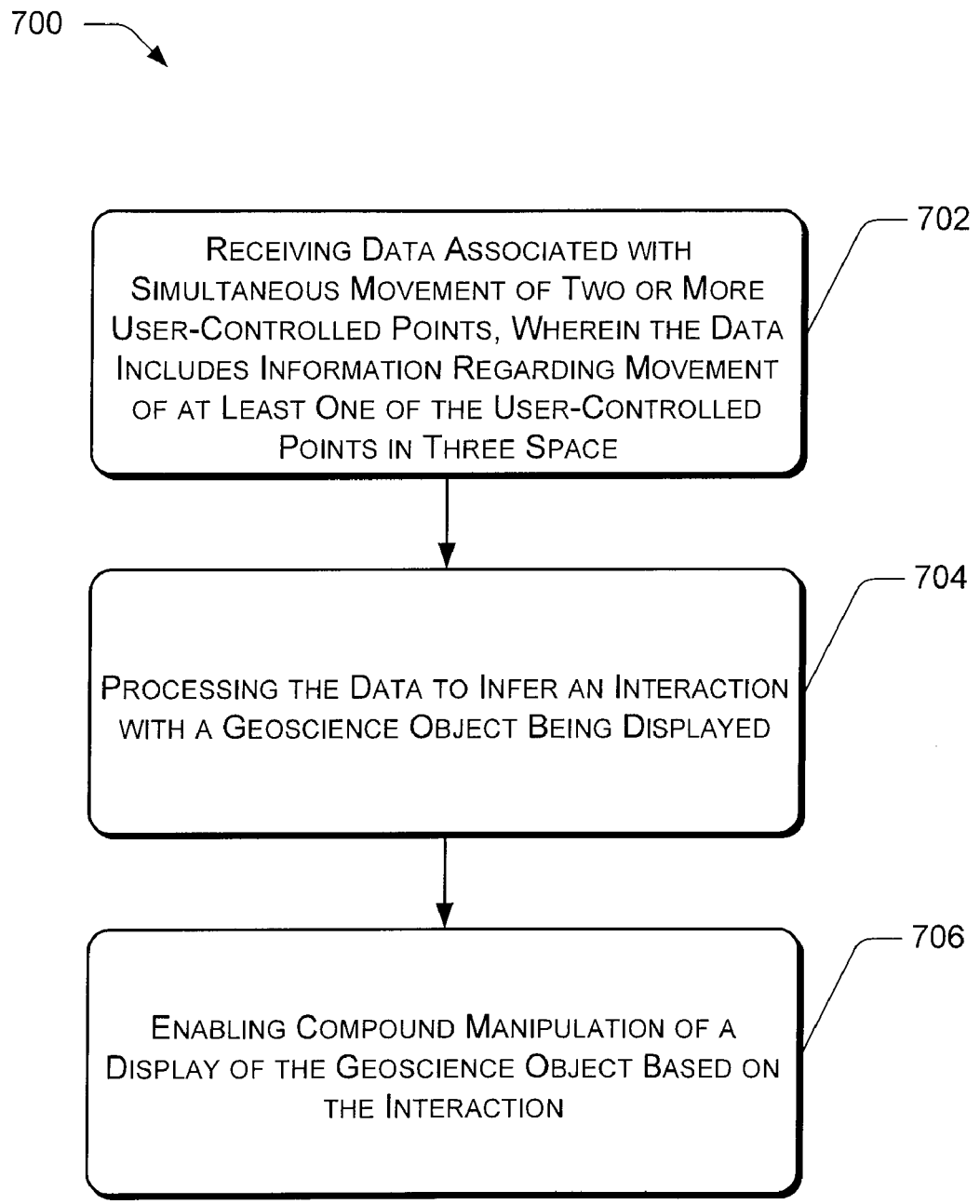
FIG. 7 illustrates example method(s) for visualization controls.
Figure 8:
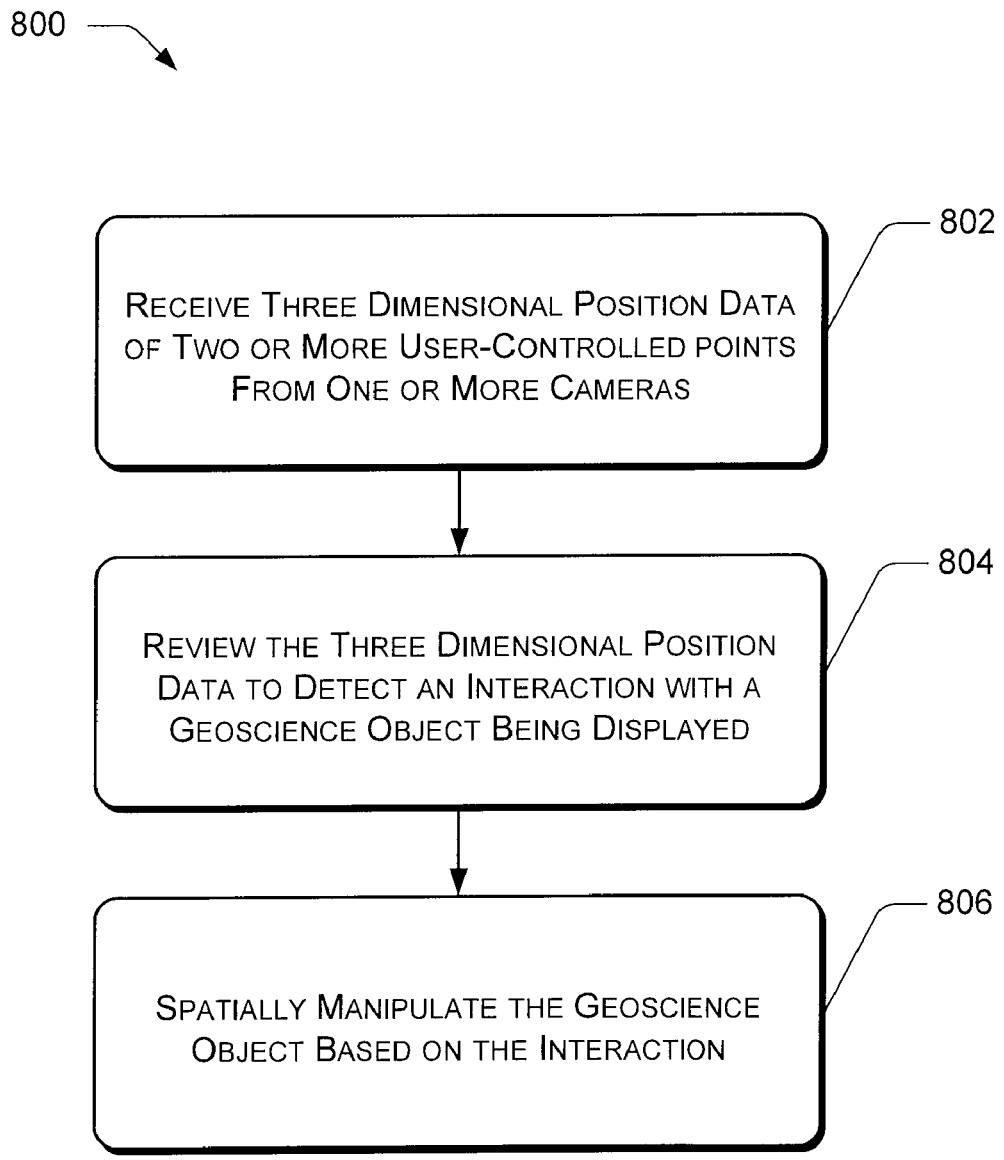
FIG. 8 illustrates example method(s) for visualization controls.

FIGS. 6-8 illustrate example methods for implementing aspects of visualization controls. The methods are illustrated as a collection of blocks in a logical flow graph representing a sequence of operations that can be implemented in hardware, software, firmware, various logic or any combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described therein. In the context of software, the blocks can represent computer instructions that, when executed by one or more processors, perform the recited operations. Moreover, for discussion purposes, and not purposes of limitation, selected aspects of the methods may be described with reference to elements shown in FIGS. 1-5.

Example Method I

FIG. 6 illustrates an example method 600 for implementing visualization controls. At block 602, the simultaneous movement of two or more user-controlled points, such as points 204, are tracked. In one implementation, this can be done using a system, such as motion monitoring system 206 which may employ one or more cameras. The user-controlled points can be on positional devices, like position devices 208 (including user body parts, computer mice, game controllers, and various other sensors and/or devices).

At block 604, the simultaneous movement of the two or more user-controlled points is interpreted as an interaction with a geoscience object, such as 3D geoscience object 202. In one implementation, one or more of the user-controlled points can be associated with a hand of the user. Such an association can be performing by, for example, point grouper 112. The points associated with the hand can then be analyzed to determine a shape of the hand, which itself may have a secondary meaning. For instance, closed handed shapes can imply that a user wishes to select a portion of the geoscience object being contacted by the hand. In one implementation, shape determination can be accomplished by shape recognizer 114.

At block 606, the display of the geoscience object is altered based on the interaction. For example, if two hands are recognized as being associated with the two or more user-controlled points, the motions of the hands relative to the geoscience object can be interpreted as various compound manipulations of the geoscience object.

For example, in one implementation, rotation of the geoscience object about an axis defined by two points can be accomplished by contacting the geoscience object at the two points with the two hands, and rotating both hands in the desired direction of rotation. Similarly, in another possible implementation, each hand, such as hands 402, 404, can contact the geoscience object at a different contact point, such as interaction points 406, 408. This contact can be inferred as the hands grabbing the geoscience object at the contact points. The hands can then move independently of one another and the influence on the geoscience object can be similar to what would be expected if the user did the same hand motions while gripping an object in the real world. In this manner the user can perform compound manipulations on the geoscience object, including one or more simultaneous acts such as scaling, shifting, rotating, translating, skewing, etc.

Example Method II

FIG. 7 illustrates an example process 700 for enabling a compound manipulation of a displayed geoscience object in accordance with one implementation of visualization controls At block 702 data associated with simultaneous movement of two or more user controlled points, such as points 204, is received. The data can be received by a system, such as motion monitoring system 206, utilizing one or more cameras. The received data can include information regarding movement of at least one of the user controlled points in three space.

For example, in one possible implementation, one user-controlled point could be located on a mouse which typically is translated about a two dimensional surface, such as a table top. Another of the two or more points could be a point, such as point 204, located on a hand of a user, such as hand 402, 404 which is free to move in three space at the whim of the user.

At block 704, the received data is processed to infer an interaction with a geoscience object, such as 3D geoscience object 202, being displayed. In one possible implementation, two or more user-controlled points can be associated with a hand of the user, and the point's orientation to one another can be used to determine if the hand is in a recognized shape with a preset meaning. In one aspect the points can be associated with the hand using a point grouper, such as point grouper 112, and the orientation of the points can be viewed against preset hand shapes, such as hand shape presets 124, by a shape recognizer, such as shape recognizer 114.

For example, a closed handed shape of the hand could mean that the hand is selecting a point on the geoscience object being contacted by the hand. In another implementation an open handed hand shape can mean that no contact with the geoscience object is desired.

In addition to hand shapes, changes in hand shapes may also have meaning. For example, transitioning from a closed handed hand shape to an open handed hand shape can mean that the point previously selected by the closed hand should be unselected.

Moreover, movement of the two or more points relative to each other may have a preset meaning. In one implementation, customized manipulations of this sort can be derived from presets, such as presets programmed or saved to movement presets 126.

For example, even if the geoscience object has not been selected, moving one point past the other in a given manner may mean that the geoscience object should be rotated in a direction corresponding to movement of one of the points.

At block 706, a compound manipulation of a display of the object is enabled based on the interaction in block 704. Given the many directions that can be travelled by the two or more points, as well as the many possible customized manipulations which can be saved in presets and associated with various hand shapes, hand shape changes and relative point movements, a variety of manipulations—including compound manipulations—can be effected.

Example Method III

FIG. 8 illustrates an example process 800 for spatially manipulating a geoscience object based on a user initiated interaction.

At block 802, position data is received from two or more user-controlled points using one or more cameras. In one implementation, the position data received is three dimensional position data. The position data can be received by a system, such as motion monitoring system 206. For example, in one implementation, the system can utilize a camera have a depth of field functionality which can detect distance information of the two or more points in a direction away from the camera.

At block 804 the position information data is reviewed to detect an interaction with a geoscience object being displayed, such as a one dimensional or multidimensional geoscience object. As mentioned above in conjunction with FIGS. 1-5, user controlled points, such points 204, can exist on their own or they can exist in groups, such as points 204 in FIGS. 3-5 which are associated with one or more hands, such as hands 306, 402, 404.

When points are associated with a hand, the association can be discovered using a point grouper, such as point grouper 112. Points associated with a hand can then be analyzed to determine a shape of the hand, which itself may have a preset meaning. Additionally, movement from one shape to another can have a preset meaning, as can movement of points in one group relative to points in another group.

At block 806, the geoscience object is spatially manipulated based on the interaction. For example, if two hands are recognized as being associated with the two or more user-controlled points, the motions of the hands relative to the object can be interpreted as various manipulations of the geoscience object which will result in a given manipulation of the geoscience object.

For example, in one implementation, once points on the geoscience object have been selected for an interaction (such as by creating a closed handed shape contacting the geoscience object), the user controlled points initiating the contact can be moved. This movement can exert an influence on the geoscience object similar to what would be expected if the user did similar hand motions while gripping an object in the real world. Thus by moving as little as two user controlled points relative to one another, the user can simultaneously induce two or more of the following operations to be effected on the geoscience object: scaling, shifting, rotating, translating and skewing.

CONCLUSION

Although embodiments of visualization controls have been described in language specific to structural features and/or methods, it is to be understood that the subject of the appended claims is not necessarily limited to the specific features or methods described. Rather, the specific features and methods are disclosed as exemplary implementations of visualization controls.

What is claimed is:

1. A method of allowing a user to interact with a geoscience object displayed using a display device comprising:
   tracking simultaneous movement of two or more points relative one another, wherein movement of at least one of the points is controlled by a user;
   interpreting the simultaneous movement of the two or more points as an interaction with the geoscience object; and
   altering a display of the geoscience object based on the interaction.

2. The method of claim 1, wherein the tracking includes monitoring at least one of the two or more points with at least one camera.

3. The method of claim 1, wherein the interpreting further includes:
   associating a plurality of the two or more points with a hand of the user; and
   utilizing shape recognition on the plurality of points to distinguish a hand shape having a first preset meaning.

4. The method of claim 3, wherein the interpreting further includes:
   displaying an image representing the hand of the user on the display device.

5. The method of claim 4, wherein the displaying further includes:
   displaying the image representing the hand of the user in a first color when the hand shape is recognized as being in an open shape and displaying the image representing the hand of the user in a second color when the hand shape is recognized as being in a closed shape.

6. The method of claim 3, further including:
   recognizing a change in the hand shape of the hand over time and associating the change with a second preset meaning.

7. The method of claim 1, wherein the interpreting includes:
   receiving a user interaction with a menu presented on the display device.

8. The method of claim 1, wherein the interpreting includes:
   recognizing a first point of the two or more points as a pivot point around which the geoscience object can be rotated.

9. The method of claim 8, wherein the altering further comprises enabling the user to effect a customized manipulation of the geoscience object based on a user input preset.

10. A non-transitory computer-readable medium having a set of computer-readable instructions residing thereon that, when executed, perform acts comprising:
    receiving data associated with simultaneous movement of two or more user-controlled points relative one another, wherein the data includes information regarding movement of at least one of the user-controlled points in three space;
    processing the data to infer an interaction with a geoscience object being displayed; and
    enabling compound manipulation of a display of the geoscience object based on the interaction.

11. The computer-readable medium of claim 10, wherein the acts further comprise recognizing a plurality of points as corresponding to a hand of the user.

12. The computer-readable medium of claim 11, wherein the acts further comprise:
    processing positions of the plurality of points to determine a shape of the hand; and
    accessing a first preset meaning associated with the shape.

13. The computer-readable medium of claim 12, wherein the acts further comprise:
    recognizing a change in shape of the hand over time; and
    accessing a second preset meaning associated with the change.

14. The computer-readable medium of claim 12, wherein the acts further comprise:
    displaying the hand; and
    stimulating a cue to recognize the shape of the hand.

15. The computer-readable medium of claim 11, wherein the acts further comprise allowing the user to select a portion of the geoscience object by interacting with the portion using the hand.

16. A method comprising:
    receiving three dimensional position data of two or more user-controlled points from one or more cameras, wherein the three dimensional position data comprises movement data for at least one of the two or more user-controlled points relative to at least another one of the two or more user-controlled points, wherein the two or more user-controlled points are movable simultaneously;
    reviewing the three dimensional position data to detect an interaction with a geoscience object being displayed; and spatially manipulating a display of the geoscience object based on the interaction.

17. The method of claim 16, wherein the receiving includes receiving the three dimensional position data from two cameras.

18. The method of claim 16, wherein the receiving includes receiving the three dimensional position data from a camera having sensitivity to depth of field.

19. The method of claim 16, wherein the reviewing includes detecting a user's selection of a portion of the geoscience object.

20. The method of claim 16, wherein the spatially manipulating includes allowing a user to effect compound manipulations of the geoscience object.

\* \* \* \* \*